United States Patent
Ovsjanikovs et al.

(10) Patent No.: US 9,892,171 B2
(45) Date of Patent: *Feb. 13, 2018

(54) PERSONALIZED RECOMMENDATION OF A VOLATILE ITEM

(71) Applicant: eBay Inc., San Jose, CA (US)

(72) Inventors: Maksims Ovsjanikovs, Menlo Park, CA (US); Ye Chen, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,878

(22) Filed: Apr. 28, 2016

(65) Prior Publication Data

US 2016/0239551 A1  Aug. 18, 2016

Related U.S. Application Data

(63) Continuation of application No. 13/009,566, filed on Jan. 19, 2011, now Pat. No. 9,336,315.

(60) Provisional application No. 61/296,325, filed on Jan. 19, 2010.

(51) Int. Cl.
*G06F 17/30* (2006.01)
*G06N 5/04* (2006.01)

(52) U.S. Cl.
CPC .. *G06F 17/30539* (2013.01); *G06F 17/30572* (2013.01); *G06F 17/30867* (2013.01); *G06N 5/04* (2013.01); *G06F 17/30864* (2013.01)

(58) Field of Classification Search
CPC ............... G06F 17/30864; G06F 17/30867
See application file for complete search history.

(56) References Cited

U.S. PATENT DOCUMENTS

| | | |
|---|---|---|
| 7,260,568 B2 | 8/2007 | Zhang et al. |
| 9,336,315 B2 | 5/2016 | Ovsjanikovs et al. |
| 2002/0107853 A1 | 8/2002 | Hofmann et al. |
| 2008/0065514 A1 | 3/2008 | Eaton |
| 2008/0189232 A1 | 8/2008 | Dunning et al. |
| 2008/0319974 A1 | 12/2008 | Ma et al. |
| 2009/0216563 A1 | 8/2009 | Sandoval et al. |
| 2011/0035379 A1 | 2/2011 | Chen et al. |
| 2011/0179081 A1 | 7/2011 | Ovsjanikov et al. |

OTHER PUBLICATIONS

"U.S. Appl. No. 13/009,566, Examiner Interview Summary dated May 8, 2015", 3 pgs.
"U.S. Appl. No. 13/009,566, Examiner Interview Summary dated Aug. 29, 2014", 3 pgs.
"U.S. Appl. No. 13/009,566, Final Office Action dated May 8, 2014", 32 pgs.
"U.S. Appl. No. 13/009,566, Final Office Action dated Sep. 8, 2015", 5 pgs.

(Continued)

*Primary Examiner* — Hung Q Pham
(74) *Attorney, Agent, or Firm* — Shook, Hardy & Bacon L.L.P.

(57) ABSTRACT

A system, method, and machine readable medium for creating a personalized recommendation of an item by creating a topic vector based on a plurality of search queries, at least one of a plurality of users associated with the search queries or a plurality of items associated with the search queries; inferring a topical preference for a user based on a search query by the user; and recommending at least one item based on the topical preference and the topic vector.

20 Claims, 14 Drawing Sheets

(56) References Cited

OTHER PUBLICATIONS

"U.S. Appl. No. 13/009,566, Non Final Office Action dated Aug. 30, 2013", 39 pgs.
"U.S. Appl. No. 13/009,566, Non Final Office Action dated Dec. 19, 2014", 25 pgs.
"U.S. Appl. No. 13/009,566, Notice of Allowance dated Jan. 6, 2016", 7 pgs.
"U.S. Appl. No. 13/009,566, Response filed Jan. 30, 2014 to Non Final Office Action dated Aug. 30, 2013", 14 pgs.
"U.S. Appl. No. 13/009,566, Response filed Apr. 20, 2015 to Non Final Office Action dated Dec. 19, 2014", 10 pgs.
"U.S. Appl. No. 13/009,566, Response filed Oct. 8, 2014 to Final Office Action dated May 3, 2014", 14 pgs.
"U.S. Appl. No. 13/009,566, Response filed Dec. 18, 2015 to Final Office Action dated Sep. 8, 2015", 09 pgs.
Adomavicius, G., et al., "Toward the next generation of recommender systems: a survey of the state-of-the-art and possible extensions", IEEE Transactions on Knowledge and Data Engineering, 17(6), (Jun. 2005), 734-749.
Agarwal, Deepak, "fLDA: Matrix Factorization through Latent Dirichlet Allocation", Web Search and Data Mining, (2010), 10 pgs.
Bell, Robert, et al., "Modeling relationships at multiple scales to improve accuracy of large recommender systems", KDD '07 Proceedings of the 13th ACM SIGKDD International Conference on Knowledge Discovery and Data Mining, (2007), 95-104.
Blei, David M, et al., "Latent Dirichlet Allocation", Journal of Machine Learning Research, 3, (2003), 993-1022.
Canny, J., "GaP: a factor model for discrete data", SIGIR '04 Proceedings of the 27th Annual International ACM SIGIR Conference on Research and Development in Information Retrieval, (2004), 122-129.
Chen, Ye, et al., "Large-scale behavioral targeting", KDD '09 Proceedings of the 15th ACM SIGKDD International Conference on Knowledge Discovery and Data Mining, (2009), 209-218.
Chu, W., et al., "Personalized recommendation on dynamic content using predictive bilinear models", WWW '09 Proceedings of the 18th International Conference on World Wide Web, (2009), 691-700.
Das, Abhinandan S, et al., "Google news personalization: scalable online collaborative filtering", Proceedings of the 16th International Conference on World Wide Web, (2007), 271-280.
Fei-Fei, L., et al., "A Bayesian hierarchical model for learning natural scene categories", IEEE Computer Society Conference on Computer Vision and Pattern Recognition, 2005. CVPR 2005, vol. 2, (2005), 524-531.
Girolami, Mark, et al., "On an equivalence between PLSI and LDA", SIGIR '03 Proceedings of the 26th Annual International ACM SIGIR Conference on Research and Development in Informaion Retrieval, (2003), 433-434.
Griffiths, Thomas L., et al., "Finding Scientific Topics", Proc Natl Acad Sci U S A., 101(Suppl 1), (Apr. 6, 2004), 5228-35.
Heinrich, Gregor, "Parameter estimation for text analysis", Technical Note, vsonix GmbH + University of Leipzig, Germany, (2008), 31 pgs.
Hofmann, T., "Probabilistic latent semantic analysis", Proceedings of Uncertainty in Artificial Intelligence, UAI'99, (1999), 289-296.
Koren, Y., "Factorization Meets the Neighborhood: a Multifaceted Collaborative Filtering Model", KDD '08 Proceeding of the 14th ACM SIGKDD International Conference on Knowledge Discovery and Data Mining, (2008), 426-434.
Lin, Chenxi, et al., "Using Probabilistic Latent Semantic Analysis for Personalized Web Search", Web Technologies Research and Development—APWeb 2005 Lecture Notes in Computer Science, vol. 3399/2005, (2005), 707-717.
Liu, Y., et al., "Shape Topics: A Compact Representation and New Algorithms for 3D Partial Shape Retrieval", 2006 IEEE Computer Society Conference on Computer Vision and Pattern Recognition, (2006), 2025-2032.
Micarelli, A., et al., "Personalized search on the world wide web", The Adaptive Web, (2007), 195-230.
Mimno, D., et al., "Polylingual topic models", Proceeding EMNLP '09 Proceedings of the 2009 Conference on Empirical Methods in Natural Language Processing: vol. 2, (1009), 880-889.
Minka, Thomas, et al., "Expectation-Propagation for the Generative Aspect Model", Proceedings of the 18th Conference on Uncertainty in Artificial Intelligence, (2002), 352-359.
Steyvers, M., et al., "Probabilistic topic models", Handbook of Latent Semantic Analysis, Psychology Press; 1st edition, (2007), 424-440.
Wang, Li, et al., "PLDA: Parallel Latent Dirichlet Allocation for Large-Scale Applications", Proceeding—AAIM '09 Proceedings of the 5th International Conference on Algorithmic Aspects in Information and Management, (2009), 14 pgs.
Wetzker, R., et al., "A hybrid approach to item recommendation in folksonomies", ESAIR '09 Proceedings of the WSDM '09 Workshop on Exploiting Semantic Annotations in Information Retrieval, (2009), 25-29.

PERSONALIZED RECOMMENDATION OF A VOLATILE ITEM

CLAIM OF PRIORITY

This patent application is a continuation of U.S. patent application Ser. No. 13/009,566, filed on Jan. 19, 2011, which claims the benefit of priority to U.S. Provisional Patent Application Ser. No. 61/296,325, entitled "Personalized Recommendation of a Volatile Item," filed on Jan. 19, 2010 which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. All Rights Reserved.

TECHNICAL FIELD

The present disclosure generally relates to recommending an item. More specifically, the present disclosure relates to methods and systems to provide a personalized recommendation of a volatile item.

BACKGROUND

Modeling user preferences for effective personalization is one of the central tasks in Web mining. Certain personalization systems seek to provide users with the most relevant information without eliciting their intentions, and relying only on user profiles and their past behavior. Examples of such systems include search personalization, Google News personalization, and Yahoo! behavioral targeting among others.

One application of Web personalization is in recommender systems in e-commerce sites such as Amazon, Netflix, or eBay, which attempt to recommend relevant items to users based on their explicit profiles (e.g., gender and age) and their implicit profiles, such as purchasing and browsing behavior. The combined user profiles are then used to suggest items deemed as the most relevant items.

SUMMARY

Disclosed, in one example is a system, method, and machine readable medium for creating a personalized recommendation of an item by creating a topic vector based on a plurality of search queries, at least one of a plurality of users associated with the search queries and a plurality of items associated with the search queries; inferring a topical preference for a user based on a search query by the user; and recommending at least one item based on the topical preference and the topic vector.

In another example, disclosed is a system, method, and computer readable medium for creating a personalized recommendation of an item by creating an item-based topical model based on a plurality of search queries and items associated with the plurality of search queries; inferring a topical preference for a user based on a search query by the user; and recommending at least one item based on the topical preference and the item-based topical model.

DETAILED DESCRIPTION

Figure 1:
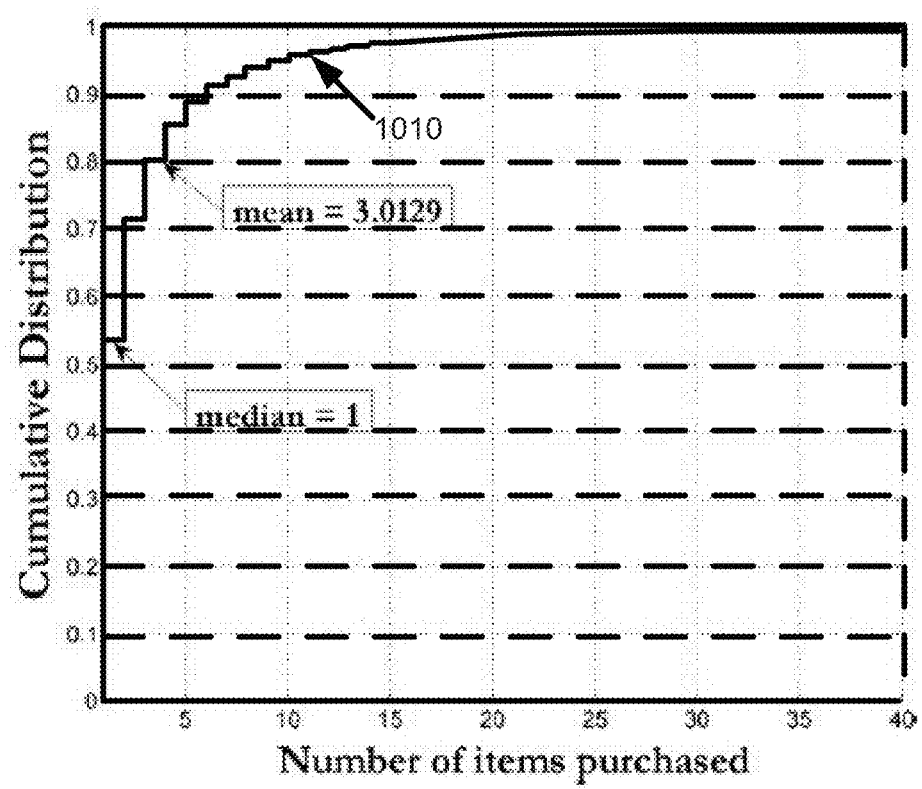
FIG. 1 is a graph that shows, in one example, the "Cumulative Distribution Function," or ("CDF") of the number of items purchased by eBay users in the "Clothing, Shoes & Accessories" ("CSA") meta-category.

The present disclosure is directed to a novel personalized recommendation system for recommending volatile items in online marketplaces such as eBay. An online marketplace presents unique challenges which make traditional recommendation systems unsuitable. Unlike systems where traditional recommendation systems have been employed, the highly volatile inventory of online commerce systems is constantly changing, making recommendation problematic.

Additionally, the data for each item is often unstructured to varying degrees—that is, the items are identifiable only by their description, as opposed to other systems which may standardize items and their descriptions to varying degrees. These challenges prohibit obtaining reliable relations between items, and complicate modeling user preferences.

The present disclosure seeks to address these challenges by mapping the users, as well as the items, to a common latent space using search queries, where reliable user modeling can be made. This mapping allows the performance of novel collaborative filtering based on a latent topic model to obtain stable relations between items, which can then be used directly for personalized recommendation. The disclosed method may improve the recommendation accuracy over a user-oblivious model, and apply it to user classification.

In one example, this disclosure may be used in an online marketplace. In some examples, the online marketplace may be a network-based online marketplace. In other examples, this online marketplace may be an online auction marketplace such as eBay, run by eBay, Inc. of San Jose Calif. Examples given herein merely typify possible variations. Unless explicitly stated otherwise, components and functions are optional and may be combined or subdivided, and operations may vary in sequence or be combined or subdivided. In the following description, for purposes of explanation, numerous specific details are set forth in order to provide a thorough understanding of example embodiments. It will be evident, however, to one skilled in the art, that the present subject matter may be practiced without these specific details.

The current disclosure provides a personalized recommendation for a volatile item by mapping both users and items to a common latent topic space, where both personalization and recommendation become possible. As used herein, an item is a product that has been listed for sale either through an auction or a traditional sale. For example, an item may be a product that is listed for sale in an online marketplace. An item can be any item bought or sold and includes, but is not limited to, physical products, virtual products, and digital media including audio, visual, audio-visual, and streaming media. As used herein, a volatile item is an item whose availability is not certain in a marketplace. In some examples it can be an item that is temporarily available. For example, an item in an online marketplace may be a volatile item if the item is not permanently available in the online marketplace. While the present disclosure can be used to recommend volatile items in a marketplace that has many volatile items, it is understood that the present disclosure may also be used to recommend items that are not volatile in marketplaces that do not possess many volatile items and any combination in-between. As used herein, a latent topic is a topic that is inferred from items. For example, a latent topic may be a type of item category. As used herein, a latent topic space is a set of latent topics.

In one example, the method of the current disclosure is based on Latent Dirichlet Allocation and matrix factorization models in collaborative filtering. However, unlike some state-of-the-art factor models for recommenders, which estimate the latent variables by factorizing the user-item rating matrix, the present disclosure builds a latent model by analyzing the search queries issued by users, and then obtain user and item profiles using statistical inference on the latent model. Therefore, the search queries act as a link between users and items, and most significantly allow building the latent model independently of individual user-item relationships. The disclosure also shows how to use this decomposition to overcome the problem of updating the model when new items or users arrive.

For a highly dynamic item space as in an online marketplace, there are issues of volatility and sparsity. As used herein, volatility refers to items that are temporarily available. For example, volatility may describe the item inventory in an online marketplace where the item inventory can change. As used herein, sparsity refers to the lack of historical transaction data for a user.

Search Personalization by Profiling

Approaches to automatic search personalization may be to either analyze the content of the browsing history of each user, thus inferring user preferences for individual terms, or build user preferences for more abstract concepts or categories. Most of the work of the latter kind relies on the existence of a well-structured reference ontology, such as the Open Directory Project (ODP), Building such a reliable ontology (catalog) in the context of an online marketplace may be difficult since the space of items is constantly evolving. Lin et al., discloses a modification of Hofmann's probabilistic Latent Semantic Analysis (pLSA) to learn user preferences for concepts derived automatically from the data. However, their method uses the triplets of user-query-page for learning, which can be infeasible with volatile items, and their emphasis is on predicting user queries rather than recommendation.

Recommendation of a Volatile Item

Current methods of item recommendation may not be applicable in recommending dynamic content, since these systems usually rely on the set of items used in the recommendations being relatively stable. As already stated, the set of items in some online marketplaces may be unstable. Additionally, some recommendation systems use user preferences given through explicit ratings. Explicit ratings are often not desirable or not practical in online marketplaces.

Several methods, however, have been recently proposed for personalized recommendation of dynamic content. Google News Personalization by Das et al. aims to recommend news articles to users based on their implicit profiles by using a combination of three separate algorithms for user modeling. In particular, the authors use pLSA to obtain latent topics. However, in their system, latent topics are, again, inferred from the user-item pairs, which is only feasible because individual pages are pre-clustered by the Google news engine into a set of news topics. Because of the user-item coupling, their model needs to be retrained every time a new user enters the system. Chu and Park address a similar problem in their paper. In their method, the preference of user u for item i is predicted $f_u W f_i$, where $f_i$ and $f_u$ are pre-computed feature vectors and $W$ is a weight matrix, which is learned through optimization. This decoupling of users and items allows the authors to overcome the cold start issue of recommending items to new users, while the learning of W can be done offline and updated periodically. Rather than using the predefined user and item feature vectors, the present disclosure learns them through statistical inference. Furthermore, the modeling of user preferences in the present disclosure allows us to recommend diverse items, while remaining relevant to the user.

Latent Topic Model

In this section, a latent topic model employed by the present disclosure in one example is introduced, and show how it can be used for user profiling, as well as recommendation in a unified framework. The model adopted by the current disclosure is similar to the Latent Dirichlet Allocation (LDA) model introduced by Blei et al. in their seminal paper. First, a brief overview of LDA will be presented and then how it is used in the framework of the present disclosure.

Latent Dirichlet Allocation

LDA is a Bayesian generative model that attempts to capture the way individual documents are created from a set of latent topics. LDA starts by assuming that there exist a set of K hidden topics that are responsible for generating words in each document. Every topic is represented by a multinomial probability distribution over the vocabulary of all possible terms. If the vocabulary contains V distinct terms, each topic k can be represented by a vector $\Phi_k \in \Delta^V$, a V-simplex, i.e., $\Phi_k(t) \geq 0\, \forall t$ and $\Sigma_{t=1}^{V} \Phi_k(t)=1$, Every document in a given corpus of N documents is, in turn, represented by a multinomial probability distribution over the set of topics $\Theta_n \in \Delta^K$ where, again $\Theta_n(k) \geq 0\, \forall k$ and $\Sigma_{h=1}^{K} \Theta_n(k)=1$. LDA further imposes Dirichlet priors with uniform parameters $\alpha$ and $\beta$ on $\Theta_n$ and $\Phi_k$ respectively.

To generate a word i in document n, first a topic $z_{n,i}$ is selected according to $P(z_{n,i}=k)=\Theta_n(k)$, and afterward the new word $w_{n,i}$ is selected from the vocabulary according to $P(w_{n,i}=t|z_{n,i}=k)=\Phi_k(t)$. This process is repeated independently for each word in the document.

A property of LDA is that only the words $w_{n,i}$ are observable. Estimating the hidden $z_{n,i}$, $\Theta_u$ and $\Phi_k$, given a corpus of documents is a problem of Bayesian inference, for which several methods including variational EM and Gibbs sampling have been proposed.

It has been noted by Girolami and Kaban that a special case of LDA with a uniform prior $\alpha=1$ corresponds to pLSA, introduced by Hofmann. The Dirichlet prior $\alpha=1$, makes every distribution $\Theta_n$ equally likely, and means that a single document can contain words from any number of topics. The importance of a sensible choice of the Dirichlet prior $\alpha$ has been stressed by Blei et al., but is generally believed not to impact model estimation for large enough data sets. As will be shown later, however, for relatively short documents such as user query logs, the quality of the model is directly related to the proper choice of an even for a large corpus consisting of millions of documents.

Generative Model for Users

Following LDA, it is assumed that each user can be characterized by a multinomial probability distribution $\Theta_u$ over a fixed set of K topics. We may interpret each element k of $\Theta_u \in \Delta^K$ as the interest of user u in topic k. In the context of an e-commerce website, a topic can represent a particular brand, a category of products, or a loosely defined concept, such as lifestyle. It may be further assumed that each topic can be characterized by a fixed multinomial distribution over the set of V distinct search queries, which can be represented by a vector $\Phi_k \in \Delta^V$. Note that unlike the unigram model in LDA, a search query can contain multiple words or special characters. Similarly to LDA, however, Dirichlet priors on $\Theta_u$ and with $\Phi_k$ specified uniform parameters $\alpha$ and $\beta$ respectively will be introduced.

The generative model we use may assume that each search query $q_{u,i}$ by user u corresponds to a latent topic $z_{u,i}$, sampled independently according to $P(z_{u,i}=k)=\Theta_u(k)$. Then, the search query is drawn according to $\Phi_k$, i.e., $P(q_{u,i}=q|z_{u,i}=k)=\Phi_k(q)$.

Note that given this generative model, the probability of a user u generating a particular query q is given by:

$$P(q \mid u) = \sum_{k=1}^{K} P(z = k \mid u) P(q \mid z = k) \qquad (1)$$
$$= \sum_{k=1}^{K} \Theta_u(k) \Phi_k(q).$$

In the following, this probability is interpreted as the user's preference for a query q. Note that the latent model allows for estimation of the user's preference for queries that they have never issued. This is especially useful when recommending search queries for users after inferring their preferences, since not only the users can be exposed to more relevant content, but also the recommended queries can yield potentially more relevant results than the user issued ones.

Estimating the model parameters from a corpus of queries generated by a population of users can then be regarded as a Bayesian approach to collaborative filtering since it leverages co-occurrence information from multiple users to learn user preferences for unseen data. The relation of the method of the present disclosure to traditional collaborative filtering is discussed in more detail below.

Generative Model for Items

To extend the user-based model for generating search queries to observing items, it is assumed that item observation by users is controlled by underlying user intentions, captured by the latent topics. In other words, a user searching for an item is guided by a certain interest, characterized by the latent topic, which results in a search query and an observed item. The simplest way to capture this is by assuming conditional independence of items and queries given the underlying latent topic:

$$P(q, i \mid u) = \sum_k P(q \mid k, i, u) P(k \mid u) \qquad (2)$$
$$= \sum_k P(q \mid k) P(i \mid k) P(k \mid u),$$

where i, q and u represent an item, query and user respectively, and we write k short for z=k in all probabilities. Here the present disclosure has introduced a novel extension of LDA, which models pair-wise observations (q, i) instead of unigram generation as in conventional document modeling. This innovation has practical significance since it can be applied to most dominant Web applications involving user behavior starting from search with the goal to find an item, such as generic search engines (query, URL), e-commerce sites (query, merchandise), social networks (query, people), and micro-blogs (query, entry).

However, for a highly dynamic item space as in eBay, introducing items to the observation pairs does not solve the volatility and sparsity issue, since the triplet (user, query item) will be at least as sparse as the pairs (user, item). Recall that the goal of item-based topic modeling is to learn a topical mixture for a given item, and hence queries serve as the topical descriptor of both users and items. This idea can be seen by integrating, over all users, the above pair-wise LDA:

$$P(q, i) = \int_u P(q, i \mid u) P(u) \, du \qquad (3)$$
$$= \int_u \sum_k P(q \mid k) P(k, i \mid u) P(u) \, du$$
$$= \sum_k P(q \mid k) P(k, i)$$
$$= \sum_k P(q \mid k) P(k \mid i) P(i),$$

the probability P(k|i) can be interpreted as the probability that the latent topic k is responsible for generating an instance of item i. We can encode these probabilities by a multinomial distribution over the set of topics, or a vector $\Psi_i \in \Delta^K$. Following LDA, we can impose a Dirichlet prior $\gamma$ on $\Psi_i$.

The present disclosure has described that the item-based topic model can be derived as a marginalized pair-wise LDA. Now it can be shown that the user-based and item-based models essentially stem from two different views of the same data. User behavior can be organized as a (user×query×item) three-dimensional tensor, where each element is a count of occurrences that a user issuing a query and then positively responding to an item impression (by clicking, bidding, or purchasing). By projecting the behavioral tensor to the (user×query) matrix, can derive the user-based topical model by LDA or other NMF techniques. Likewise by projecting the behavioral tensor to the (item×query) matrix, the method of the present disclosure can learn the item-based topical model. Since the underlying data is the same, the derived latent topic space is naturally shared by the user and item dimensions. So far, the present disclosure has successfully addressed the volatility issue that makes directly decomposing the (user×item) matrix impractical, by leveraging the semantic-rich query layer. This contribution is significant since most Web 2.0 type of data exhibits high dynamism.

It is important to note that under the item-based model, the method of the present disclosure can estimate the per-topic query mixture $P(q|k)$, without observing individual user behavior. This is useful if the available data set consists of queries and items, rather than users and queries, which is particularly true for some aggregated query logs available from data marts. Another advantage of deriving both user-based and item-based models at a common latent topical space is that a user-item preference score can be computed by a dot-product of $P(k|u)$ and $P(k|i)$, as will be illustrated further in the recommendation section.

The primary difference between this model and the standard LDA is that the additional layer of search queries allows the interaction between users and items to be decoupled. This is essential for model estimation in the volatile context of eBay and other online marketplaces, since although the inventory is constantly evolving the set of search queries employed by the users is relatively stable. Furthermore, using the search queries allows the topics to be more accurately modeled by reducing the polysemy associated with individual vocabulary terms. This will also allow for item recommendation as described in the following section.

Note that a central assumption in LDA and, by extension, in the model of the present disclosure is that topics within a document are infinitely exchangeable. In this case this means that $P(z_1, z_2, \ldots, z_l|u) = P(\pi(z_1, z_2, \ldots, z_l))$ for any permutation $\pi$. In other words, a user is equally likely to generate any permutation of latent topics (this corresponds to the bag-of-topics assumption). By de Finetti's theorem, latent topics for a given user are conditionally independent given the user's topic preferences $\Theta_u$. This assumption naturally extends to the generative model for items.

Personalized Recommendation

Once we adopt the generative models for queries and items described earlier, both query and item recommendation can be performed by using the model parameters $\Theta_u$ and $\Phi_k$. In this section, several methods for personalized recommendation will be described.

Query Recommendation

Given the user preference vector for latent topics $\Theta_u$ and the latent topic distributions $\Phi_k$, $k \in 1 \ldots K$, search queries may be recommended to the user u by simulating the generative process described in the section "Generative Model for Users." Namely, to generate a query q, first sample a latent topic z with $P(z=k) = \Theta_u(k)$, and then select a query q from $\Phi_z$, s.t. $P(q=t) = \Phi_z(t)$, Unlike traditional recommendation systems, which suggest the items the user is most likely interested in, this process can be randomized. The stochastic delivery mechanism allows the recommendation set to be diversified yet relevancy to the user can be maintained, while yielding a 100% recall of the entire inventory of items in an asymptotic sense.

Item Recommendation

Note that the process described above, in some examples, allows recommendation of items to be made to users. To do this, the recommended queries can be issued to the search engine, and the retrieved results can be used as the recommended items. In this way, the queries used for recommendation will correspond to likely search queries in the latent topic k, for which the user has shown interest. This means, in particular, that the queries used for recommendation will rarely come from the set of queries issued by the user in question. Instead, they will be the most representative queries in the user's topics of interest. In experiments, the most likely queries in each latent topic are generic terms describing the topic (e.g., "wedding dress" or "men's shirt"). Note that this recommendation step is possible only because topic modeling is performed on full search queries, rather than individual terms. Reconstructing a good search query given a set of possibly unrelated search terms is a challenging task. However, since the topic model relies on full search queries by the users, the most representative queries can be issued in each latent topic easily.

If N recommendation slots are available, N distinct search queries may be generated, by first selecting N latent topics from $\Theta_u$ without replacement, and use the top item provided by the search engine for each of these queries. This allows the method to ensure that the queries selected for recommendation are generated by different latent topics, which can be loosely interpreted as a way to increase entropy of the recommended items. In other words, the recommended items will be as distinct from each other as possible, while still being relevant to the user. One skilled in the art with the benefit of applicant's disclosure will appreciate that different combinations of the number of searches run and the items recommended based upon those searches can be used.

Relation to Latent Factor Models

Latent factor models are a set of methods in collaborative filtering. Briefly, these methods aim to map each user and each item to a common latent space (generally $\mathbb{R}^f$ for some fixed f). In this space, the prediction for user u's preference for item i is given by: $\hat{r}_{ui} = b_{ui} + p_u^T q_i$, where $b_{ui}$ is a baseline predictor, which is typically a sum of various average ratings, Note that in the model of the present disclosure, each user is mapped to a vector of topic preferences $\Theta_u$, s.t. $\Theta_u(k) = P(k|u)$, $k \in 1, \ldots, K$ and each item can be mapped to a vector $\Psi_i$, $\Psi_i(k) = P(k|i)$, $k \in 1, \ldots, K$. Therefore, it is possible to apply the factor model directly by considering for a given user u, the inner product of $\Theta_u(k)$ with $\Psi_i(k)$ for each item i, and recommending those items with the highest predicted score.

The major difference between the method of the present disclosure and standard latent factor models, is that in most cases, the user-item matrix is assumed to be fixed, and the latent factor model is derived either through rank-reduction of this matrix, numerical optimization or statistical inference. The latent topic model for users in the method of the present disclosure is derived by considering the relations between users and search queries, and is independent of user-item interactions. Similarly, the latent topic model for items is independent of users, and is derived entirely from item-query conversion. Despite this, since the latent topic model for search queries is fixed, the users and items are mapped to the same low-dimensional space, which allows for generation of recommendations.

This decoupling of users and items also allows the method of the present disclosure to overcome one of the limitations inherent in the latent factor models, which require re-computing the factor model each time a new user or an item are introduced. This issue is particularly prominent in an online marketplace such as eBay where new items are introduced constantly. Since the latent factor model is determined by the relations between search queries and latent topics, the method of the present disclosure may only need to recompute the model once significant new search queries are introduced. Model re-computation can be done offline, and periodically, without impacting user experience. Model estimation and inference are discussed in the following section.

Learning and Inference

A key component to the success of the recommendation system described above is an accurate estimation of the latent topic model. This consists of per-topic query probabilities $P(q|k)=\Phi_k(q)$ as well as user and item preferences for topics $P(k|u)=\Theta_u(k)$ and $P(k|i)=\Psi_i(k)$, where, as above, k is short for z=k in all probabilities. In this section deriving these probabilities in practice is shown. This process is separated into two parts: estimating the query probabilities $\Phi_k$, a estimating user and item preferences $\Theta_u$ and $\Psi_i$. Estimating $\Phi_k$ is the most time consuming part of the method, and can be performed offline in some examples; this step can be called model fitting. The step of estimating $\Theta_u$ and $\Psi_i$ on the other hand, can be done efficiently online, and can be called inference. Details on each of these two steps will be given below.

Model Fitting

User-Based Modeling Fitting

Estimating $\Phi_k$ from data, can be done in a similar way as for LDA. A variety of methods exist for estimating the model from a given corpus of documents, such as variational Expectation-Maximization (VEM) originally proposed by Blei et at, Expectation Propagation (EP) by Minka and Lafferty, and Gibbs sampling by Griffiths and Steyvers. Griffiths and Steyvers also showed empirically that Gibbs sampling converges faster to a known ground truth model than either VEM or EP methods. Therefore, Gibbs sampling can be used in one example for parameter estimation.

The input to the user-based model estimation is a set of users, with a list of search queries that each user issued in a fixed period of time, where repetitions are naturally allowed. The goal of the Gibbs sampler is to determine for each query in the dataset the latent topic that this query was generated by. Then, the model parameters $\Phi_k$ and can be trivially computed as statistics on these topic assignments.

In some examples, the search queries that are used to generate the model are normalized. That is, queries are corrected for grammar and spelling, or for common misspellings, mispronunciations, and common alternative search terms. However, in other examples this operation is omitted.

For completeness a brief derivation of the Gibbs sampler used in practice is given. This derivation follows the presentation by Heinrich, which is slightly different from that of Griffiths and Steyvers. The main idea of Gibbs sampling for LDA is to derive the distribution $$p_k = P(z_{u,i} = k | \vec{z}\neg_{u,i}, \vec{u}, \vec{q}), \qquad (4)$$

where $z_{u,i}$ is the topic responsible for generating query i of user u, $\vec{z}\neg_{u,i}$ are topic assignments for all other queries, while $\vec{u}$ and $\vec{q}$ are users and queries respectively. Once this distribution is established, the Gibbs sampler can be run with a random initialization of $\vec{z}$ until convergence. For LDA:

$$p_k = \frac{P(\vec{z}, \vec{u}, \vec{q})}{P(\vec{z}\neg_{u,i}, \vec{u}, \vec{q})} \qquad (5)$$

$$= \frac{P(\vec{q}|\vec{z})}{P(q_{u,i})P(\vec{q}\neg_{u,i}|\vec{z}\neg_{u,i})} \frac{P(\vec{z}|\vec{u})}{P(\vec{z}\neg_{u,i}|\vec{u})}.$$

Under LDA, it is easy to derive both $P(\vec{q}|\vec{z})$ and $P(\vec{z}|\vec{u})$ by integrating over the parameter space, since for example:

$$P(\vec{q}|\vec{z}) = \int_{\vec{\Phi}} P(\vec{q}|\vec{z}, \vec{\Phi}) P(\vec{\Phi}|\beta) d\vec{\Phi} \qquad (6)$$

$$= \prod_{k=1}^{K} \int_{\Phi_k} \prod_{q=1}^{V} \left( \Phi_k(q)^{\vec{z}^k(q)} P(\Phi_k|\beta) \right) d\Phi_k$$

$$= \prod_{k=1}^{K} \frac{1}{B(\beta)} B(\vec{z}^k + \beta),$$

where K is the total number of latent topics, V is size of the vocabulary of search queries, $\Phi_k(q)=P(q|k)$, $\vec{z}^k(q)$ is the number of times query q is assigned to topic k in the topic assignment vector $\vec{z}$ since a query can be used multiple times by users and each instance can potentially be assigned to a different latent topic), and B is the multivariate beta function $$B(\vec{x}) = \frac{\prod_{i=1}^{V} \Gamma(x_i)}{\Gamma\left(\sum_{i=1}^{V} x_i\right)}.$$

Deriving $P(\vec{z}|\vec{u})$ is analogous, with topics replaced by users, queries replaced by topics and $\beta$ replaced by $\alpha$. Note that, $\alpha \in \mathbb{R}^k$, $\beta \in \mathbb{R}^V$, but in practice, symmetric priors can be used, such that $\beta_q = \beta$ and $\alpha_k = \alpha \forall q,k$ and $\alpha, \beta \in \mathbb{R}^+$. The final distribution for the Gibbs sampler is:

$$p_k \propto \frac{\vec{z}\neg_{u,i}^k(q_{u,i}) + \beta}{\sum_{w=1}^{V} \left(\vec{z}\neg_{u,i}^k(w) + \beta\right)} \frac{\vec{z}\neg_{u,i}^k(u) + \alpha}{\sum_{j=1}^{K} \left(\vec{z}\neg_{u,i}^j(u) + \alpha\right)}, \qquad (7)$$

where $\vec{z}\neg_{u,i}^k(q)$ is the number of times query q is assigned to topic k in $\vec{z}\neg_{u,i}$, and $\vec{z}\neg_{u,i}^k(u)$ is the number of times topic k is assigned to a query by user u.

Once the Gibbs sampler converges to a stationary distribution, the model parameters can be computed as:

$$\Phi_k(q) = \frac{\vec{z}^k(q) + \beta}{\sum_{w=1}^{V} \vec{z}^k(w) + \beta}. \qquad (8)$$

This expression makes apparent, the smoothing effect of the input parameter $\beta$ on $\Phi_k$, since even if a latent topic k is assigned to instances of only one query q, the probabilities $\Phi_k(w)=P(w|k)$, $w \neq q$ will be non-zero because of $\beta$.

Item-Based Model Fitting

The user-based method presented above assumes that the input data contains a set of user-query pairs. As discussed earlier, the model for generating items allows the model parameters $\Phi_k(q)$ to be estimated from item-query pairs instead. In this case, the method of the present disclosure assumes that the dataset consists of a set of items together with queries that were used by users to arrive at each of these items, that is, the query conversion data. Let $z_{i,j}$ be the latent topic responsible for generating query j that led to item i. The joint probability distribution used by the Gibbs sampler in this case becomes:

$$p_k = P(z_{i,j} = k | \vec{z}_{\to i,j}, \vec{i}, \vec{q}) \quad (9)$$

$$= \frac{P(\vec{z}, \vec{i}, \vec{q})}{P(\vec{z}_{\to i,j}, \vec{i}, \vec{q})}$$

$$= \frac{P(\vec{q}|\vec{i},\vec{z})P(\vec{z}|\vec{i})P(\vec{i})}{P(\vec{q}|\vec{i},\vec{z}_{\to i,j})P(\vec{z}_{\to i,j}|\vec{i})P(\vec{i})}$$

$$= \frac{P(\vec{q}|\vec{z})P(\vec{z}|\vec{i})}{P(\vec{q}|\vec{i},\vec{z}_{\to i,j})P(\vec{z}_{\to i,j}|\vec{i})},$$

where the third equality follows from the conditional independence of items $\vec{i}$ and queries $\vec{q}$ given $\vec{z}$ assumed earlier. Note that the final expression for $p_k$ has the same form as Equation (5) above. In addition, the Dirichlet prior $\gamma$ assumed at $\Psi_i$, where $\Psi_i(k)=P(k|i)$, forces the distribution of topics given an item to have the same form as the distribution of topics given a user. Thus, the Gibbs sampler can be run in the same way as above to get $\Phi_k(q)$.

Inference

Once the model parameters $\Phi_k$ have been estimated using one of the methods above, the inferential task consists of learning either $\Theta_u$ or $\Psi_i$, for a user u or item i. Note that the input for inference may be different from the input for the model fitting step. In particular, f the model parameters $\Phi_k$ are learned on a set of queries issued by a group of users, model inference must b able to learn the user preference vector $\Theta_u$ and item-topic vector $\Psi_i$ for users and items that do not necessarily appear in the original data set. Nevertheless, the search queries employed by the new users must be similar to the queries used for model fitting. This is a natural assumption since, as previously mentioned, the vocabulary of search queries evolves at a significantly slower rate than the inventory of items and the population of users.

For concreteness, suppose the data set consists of a single user u with all the search queries issued by this user in a fixed time period, and the goal is to estimate the user preference vector $\Theta_u$. Learning $\Psi_i$ from the queries used to arrive at an item i in a fixed time period is identical with appropriate change in notation.

The Gibbs sampling procedure described above allows the method of the present disclosure to perform inference in a straightforward fashion. Again, for every query $q_{u,i}$ in the new dataset, the aim is to determine which latent topic z is responsible for generating this query. For this, the Gibbs sampler may be run in the same fashion as above, while only iterating over queries of user u. The probability distribution for the Gibbs sampler is nearly identical to Equation (7):

$$p_k \propto \frac{\vec{n}^k(q_{u,i}) + \vec{z}^k_{\to u,i}(q_{u,i}) + \beta}{\sum_q^V (\vec{n}^k(q_{u,i}) + \vec{z}^k_{\to u,i}(q) + \beta)} \frac{\vec{z}^k_{\to u,i}(u) + \alpha}{\sum_j^K (\vec{z}^j_{\to u,i}(u) + \alpha)}, \quad (10)$$

where $\vec{z}$ is the assignment of latent topics to queries only of user $\vec{n}^k(q_{u,i})$, while n is the number of times query $q_{u,i}$ was assigned to topic k in the model fitting step. Note that $\vec{n}$ is the only part of the distribution that depends on the model fitting, and can be seen as a precomputed sparse V×K matrix of counts.

After convergence of the Gibbs sampler, the user preference vector $\Theta_u$ can be computed as:

$$\Theta_u(k) = \frac{\vec{z}^k(u) + \alpha}{\sum_{j=1}^K \vec{z}^j(u) + \alpha}. \quad (11)$$

Note that if the user u issued N search queries, one sampling iteration of the Gibbs sampler will require only N topic assignments. Convergence is usually achieved after several Gibbs iterations and inference is very fast. Therefore, learning model parameters $\Theta_u$ and $\Psi_i$ for new users and items through inference is very efficient and does not require extensive computations, unlike conventional matrix factorization models.

Parallelization

It is important to emphasize that inference lends itself naturally to parallelization, since no data needs to be shared between individual users and items, except for the fixed and precomputed matrix $\vec{n}$. Therefore, in some examples a parallel implementation of inference to learn both the item and user topical preference vectors for a large population in real time can be used, particularly for unseen users and items. In fact, model estimation described earlier can also be parallelized efficiently for large scale applications, Wang et al. describe a large scale parallel implementation of a Gibbs sampler for LDA using WI and MapReduce.

Experimental Results

In this section, the results Obtained using the method of the present disclosure on large-scale real-world data collected from eBay is shown.

Data Preprocessing and Analysis

The dataset consists of the search queries entered by the eBay users over a two-month period (2009-05-10 to 2009-07-09). Only queries for which the search engine returned at least one item in the "Clothing, Shoes & Accessories" (CSA) meta-category are considered. Note that generally the method assumes that each query must reflect an interest of a user which is suitable for a brand and product-driven category such as clothing and accessories. Furthermore, during the model fitting step casual users may be removed who did not purchase any items in this time period, This greatly reduces the data set and leaves 2.6 million users with an average of 2.5 queries per user per day. Finally, the vocabulary of possible queries may be limited to only consider those queries that were entered by at least 30 different users in this time period. This last step reduces the data by an additional 8 percent, but also significantly reduces the computational complexity of the Gibbs sampler. In the end, our vocabulary consists of approximately 50,000 search queries.

Figure 2:
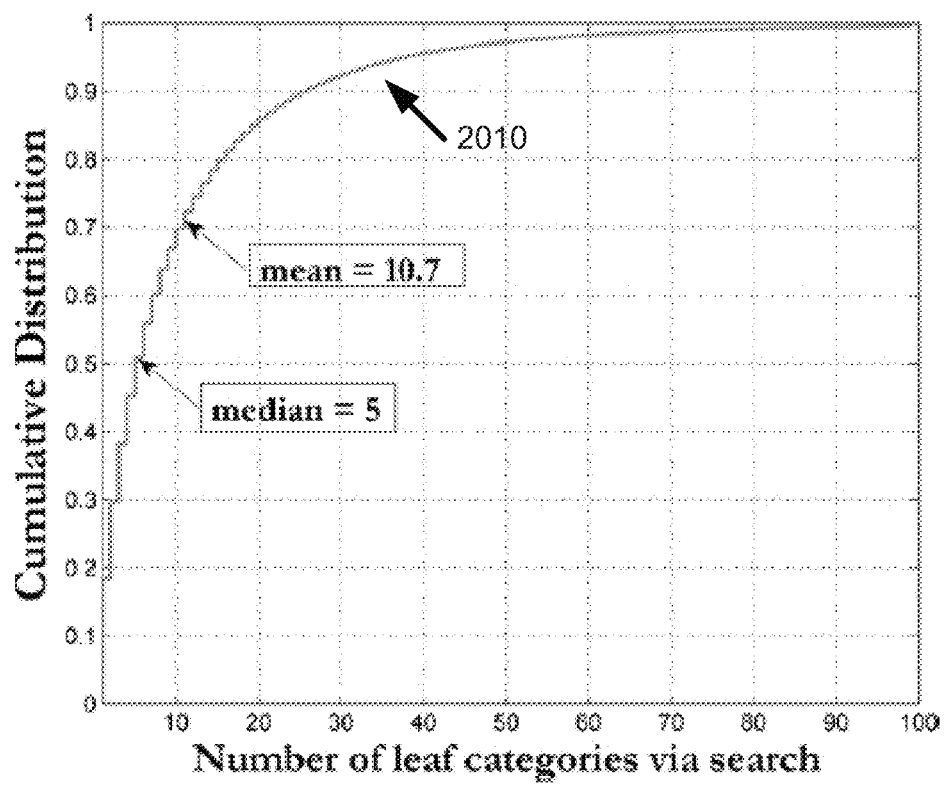
FIG. 2 is a graph that shows in one example, the CDF of the subcategories of CSA explored by users. It can be appreciated that although the majority of users only bought one item, they often explore several subcategories.

FIGS. 1 and 2 show trends 1010 and 2010 observed in the data. In particular, FIG. 1 shows that over fifty percent of the users who bought items in the CSA meta-category of eBay during two months, only bought one item in this meta-category (while the average number of purchased items is three, which is explained by the heavy tailed nature of the distribution: a small number of users bought very many items). On the other hand, FIG. 2 shows that the median number of subcategories (as defined by the current eBay taxonomy) that individual users looked at is five, while the mean is 10.7. This shows that users at eBay are generally curious and are willing to explore products in a variety of categories. In particular, this means that recommendations based purely on purchasing behavior may not be able to capture the wide range of interests that users have.

Choice of Dirichlet Priors α and β

Figure 3:
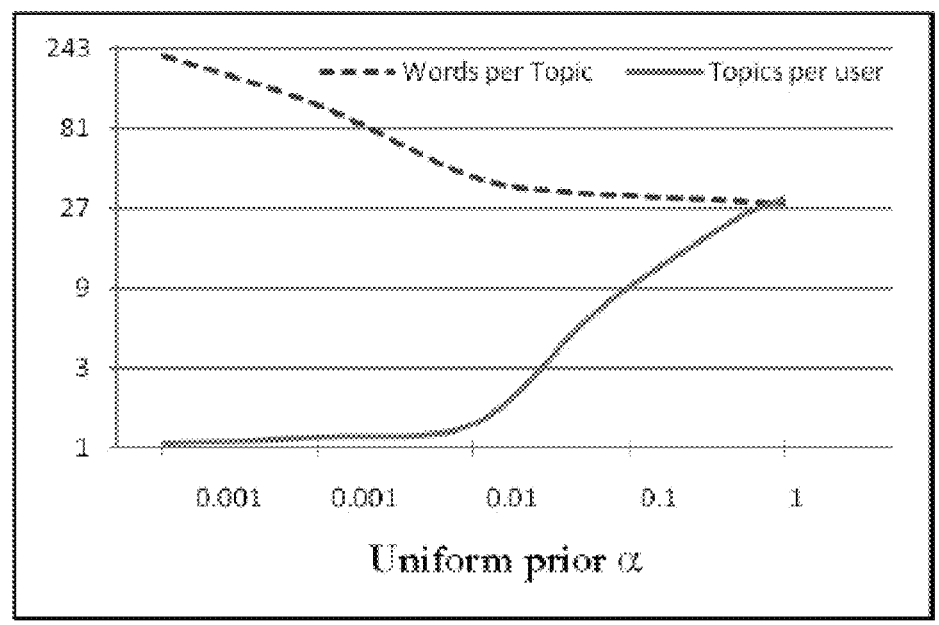
FIG. 3 shows in one example the dependences of the average number of topics per user and the average number of words per topic on the Dirichlet prior et with $\beta=0.1$. The solid line shows the average number of topics that cover at least 50% of user's interests $\Theta_u$, while the dashed line shows the average number of words that cover at least 50% of topic's distributions $\Phi_k$.
Figure 4:
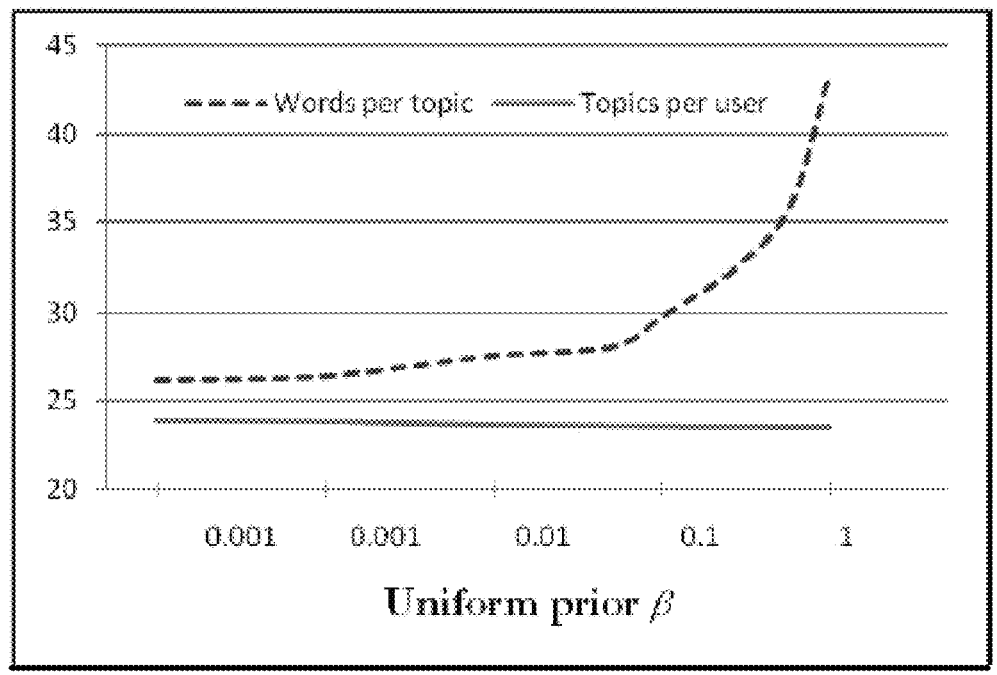
FIG. 4 shows in one example the dependences of the average number of topics per user and the average number of words per topic on the Dirichlet prior $\beta$ with $\alpha=0.5$. The solid line shows the average number of topics that cover at least 50% of user's interests $\Theta_u$, while the dashed line shows the average number of words that cover at least 50% of topic's distributions $\Phi_k$.

One of the principal advantages of the LDA model over pLSA is the flexibility of prior parameters α and β. Indeed, pLSA is a maximum a posteriori LDA model estimated with a uniform Dirichlet prior α=1. To demonstrate the importance of this distinction, which holds even for a large dataset, the inventors of the present disclosure considered a sample of queries issued by 400K users, and estimated the model for 100 topics and various values of α and β. FIGS. 3 and 4 shows the dependences of the average number of topics per user and the average number of words per topic on the priors α and β, respectively. For each user u we consider the median of $\Theta_u$: the minimum number of topics, such that their cumulative distribution in $\Theta_u$ is at least 0.5, and similarly, for each topic k, we consider the median of $\Phi_k$: the minimum number of queries such that their cumulative distribution in $\Phi_k$ is 0.5.

Note that as α approaches the average number of topics per user grows considerably which means that on average users' interests become diffused over more topics. However, as a result of this, fewer words are necessary to explain each topic and $\Phi_k$ becomes more and more concentrated. The effect of β is less pronounced on the average number of topics per user as it remains constant, whereas the number of words per topic grows. This is consistent with the intuition that β controls how concentrated each topic is. Since the ultimate goal is to recommend items to users, highly concentrated topics with the most relevant queries having a high probability is desired. Furthermore, since the majority of users only explore a small number of subcategories, it is expected that each user will be interested in a small number of latent topics. Therefore, we use α=0.05, which corresponds to the median of 5 topics per user on average, and β=0.1. The dependence of the model on the number of latent topics will be explored in the following subsections.

Model Evaluation

To evaluate the quality of our method, we evaluate the log-likelihood of unseen data given the model. For this, the model parameters $\Phi_k$ and $\Theta_u$ are computed for the two-month data described above. This allows for predictions of the preference P(q|u) of user u for a particular query q using Equation (1). The log-likelihood of a set of queries for a user is given simply as $\Sigma_i \log(P(q_i|u))$. Thus, to evaluate the quality of the model, the log-likelihood of the search queries issued by the same users for which the model was estimated is evaluated, but in the four days following the training period. A good predictive model would result in a small absolute value of the log-likelihood, and thus, if the model correctly captures the latent topics and user interests, the predictive error should be small.

As a baseline predictor, the global model is used, which is oblivious to individual user's preferences. This corresponds to setting the number of topics to one. Then under uniform Dirichlet priors, the probability P(q|u) is just the fraction of times this query was used in the training data independent of u. In other words, each query is characterized by its overall popularity in the training data.

Figure 5:
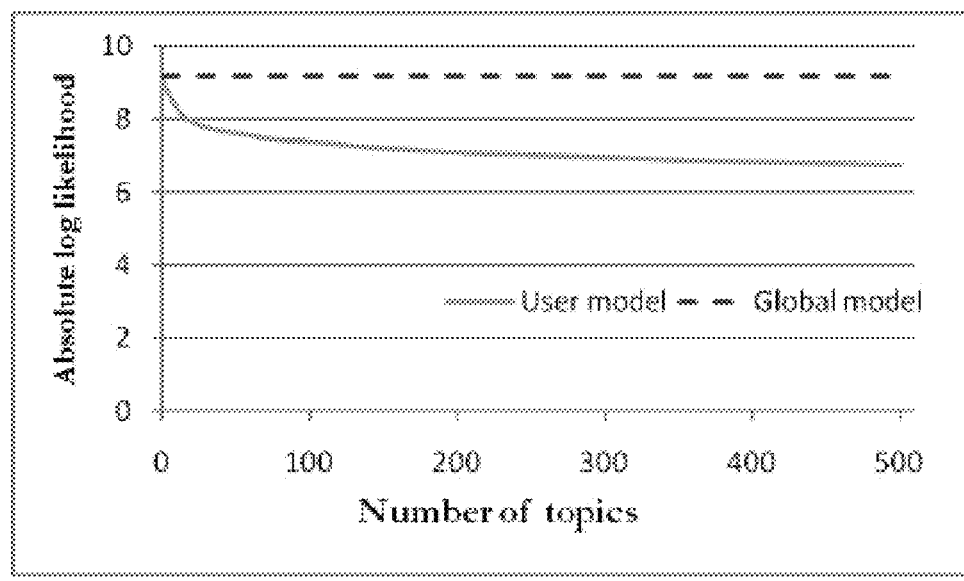
FIG. 5 shows in one example, the absolute log-likelihood of the test data given the trained models, as a function of the number of topics.

FIG. 5 shows the dependence of the absolute log-likelihood of the testing data on the number of topics K. Note that the global user-oblivious model with one topic results in 36 percent higher absolute log-likelihood than the model with 500 topics and 31 percent higher than the model with 200 topics. Interestingly, no over-saturation phenomena was observed and the absolute log-likelihood decreases as far as 500 latent topics. However, the rate of the decrease slows down beyond 200 topics.

Figure 6:
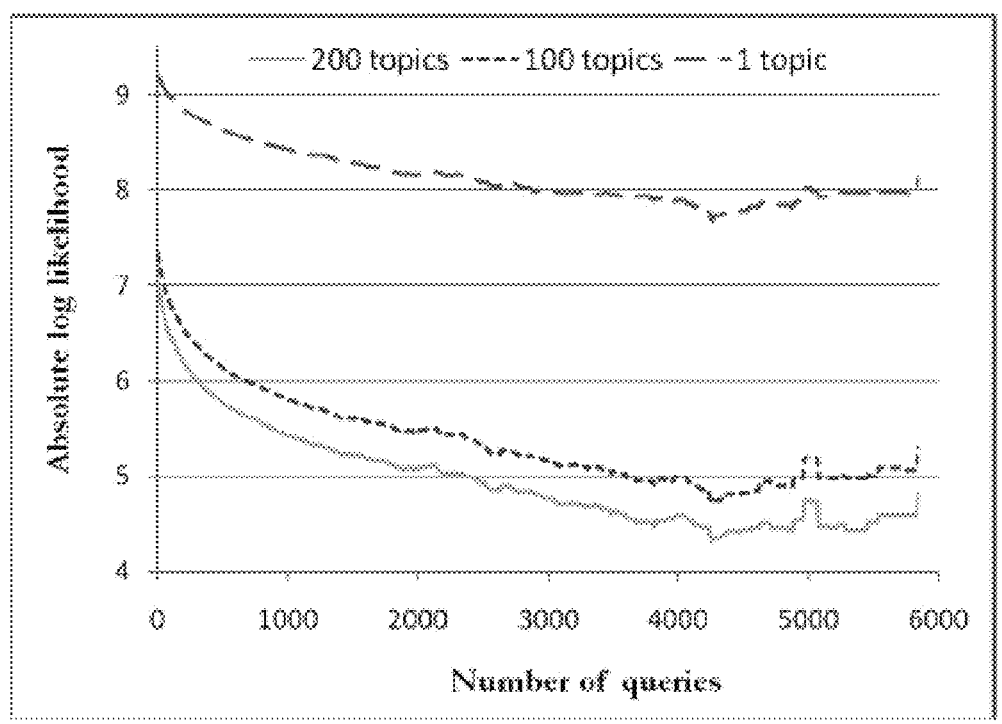
FIG. 6 shows in one example, an absolute log-likelihood of the test data given the trained models, as a function of the number of queries.

FIG. 6 shows that the improvement over the global model is significantly more pronounced for the users who issued many queries (in the training set). Thus, over 50 percent improvement in absolute log-likelihood is achieved using a model with 200 topics for users who entered over 400 search queries. This shows not only that topical preferences are learned more accurately for users who have a longer search history, but also that the topics themselves represent persistent structure in the data.

Figure 7:
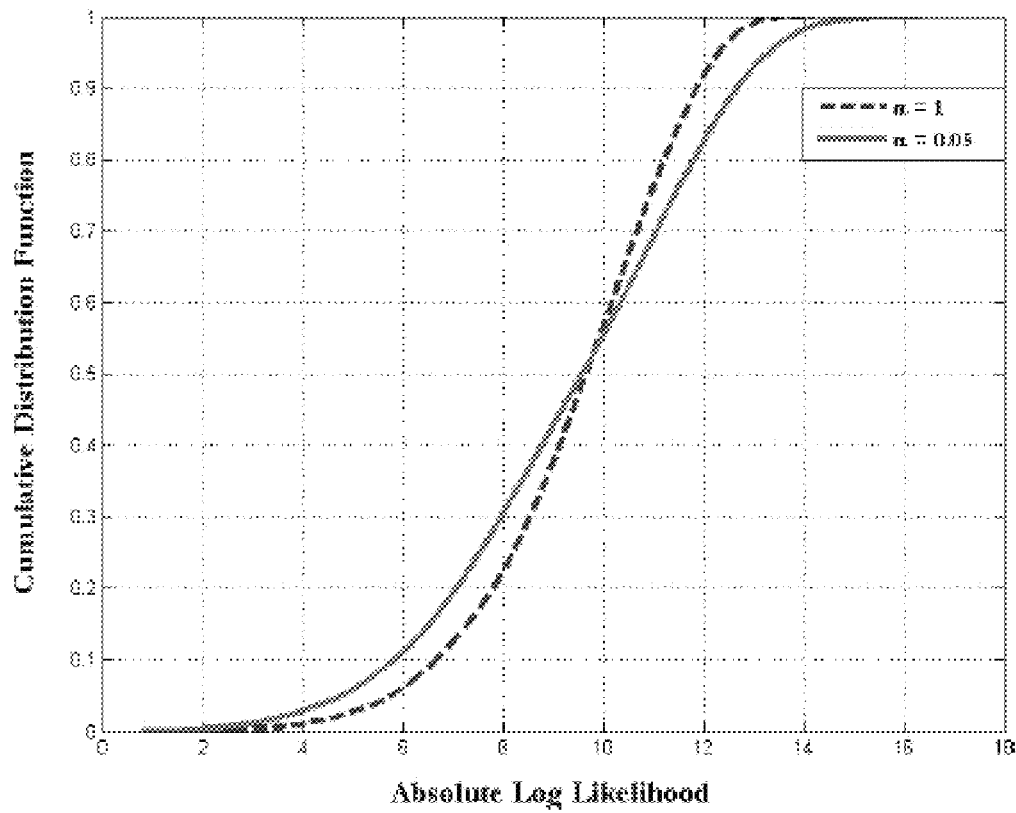
FIG. 7 shows in one example the CDF of the absolute log-likelihood of the new queries for $\alpha=1$ and $\alpha=0.05$. The latter has low error for more queries, but also higher error in the worst case.

FIG. 7 shows the dependence of the absolute log-likelihood on the Dirichlet prior α. Although the total log-likelihood for different choices of α is quite similar, the CDF of the absolute log-likelihood of the test queries with the two models are quite different. Note that the model with α=0.05 makes more predictions with smaller absolute log likelihood but, on the other hand, makes predictions with higher absolute likelihood than the model 20 with α=1. In other words, the correct predictions of the model with α=0.05 are better than the correct predictions of the model with α=1, while the incorrect predictions are worse. This is in accordance with the intuition that higher values of α result in more smooth or "averaged out" models. Arguably, in the context of recommending items, more accurate predictions are more important, although significantly incorrect recommendations can impact user trust.

User Classification

Finally, the usefulness of the method of the present disclosure in a user classification task is explored. This also helps illustrate the effect of the choice of the number of topics on model estimation. The goal is to classify eBay users into males and females based solely on their search queries in the CSA category. A simple Bayesian classifier was used for this task. Namely, two separate models $\mathcal{M}_m$ and $\mathcal{M}_f$, one for male and another for female users are built. Then for a new user with a history of search queries $Q_u$, $l_m = \log(P(Q_u|\mathcal{M}_m))$, is evaluated and then this user is declared male if $l_m > l_f$ and female otherwise.

Figure 8:
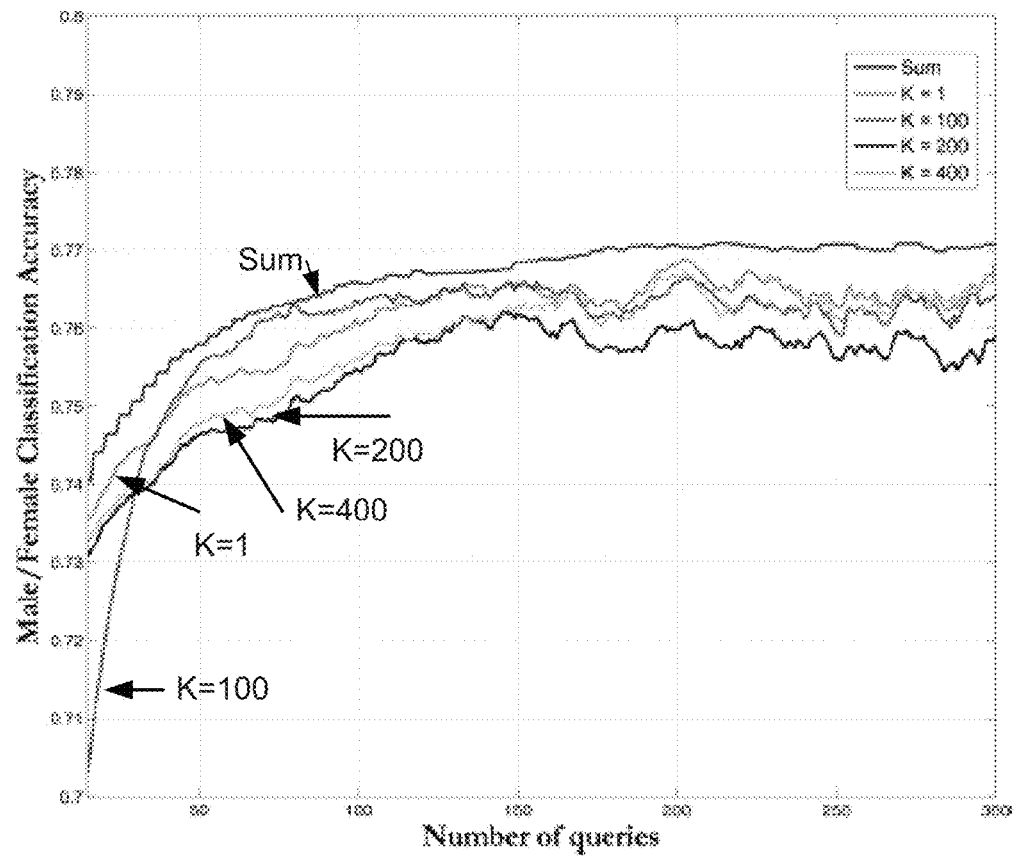
FIG. 8 shows in one example the user classification accuracy into male and female for different numbers of latent topics t, as a function of the number of queries. It can be noted that the method, incorporating models with multiple number of topics (Sum) performs better than any individual model.

Approximately 40 percent of the eBay buyers in the clothing category provide their gender information. Thus, 1 million users are used to train the two models. FIG. 8 shows the classification accuracy of this method for models with different number of latent topics, as a function of the number of queries the user entered. For example, using K=100 latent topics 75 percent accuracy is achieved for users who entered more than 40 queries.

This method can be augmented by summing up log-likelihoods of the user's queries over models with a different number of latent topics. In other words, if $\mathcal{M}_m(K)$ is the model computed on the male users with K latent topics, then $l_m = \Sigma_t \log(P(Q_{i,t}|\mathcal{M}_m(K)))$, with $l_f$ modified similarly. Note that this ensemble method performs strictly better for all users than any of the individual models, Therefore, in the context of user classification, there is no single best choice of the number of topics for model estimation. Instead, it is better to ensemble models with different number of latent topics. A sensible interpretation of this result is that the number of latent topics is the scale at which the data is explained by the model. A multi-scale approach then is most efficient since it incorporates views from all scales.

Example System and Method Implementations

Figure 9:
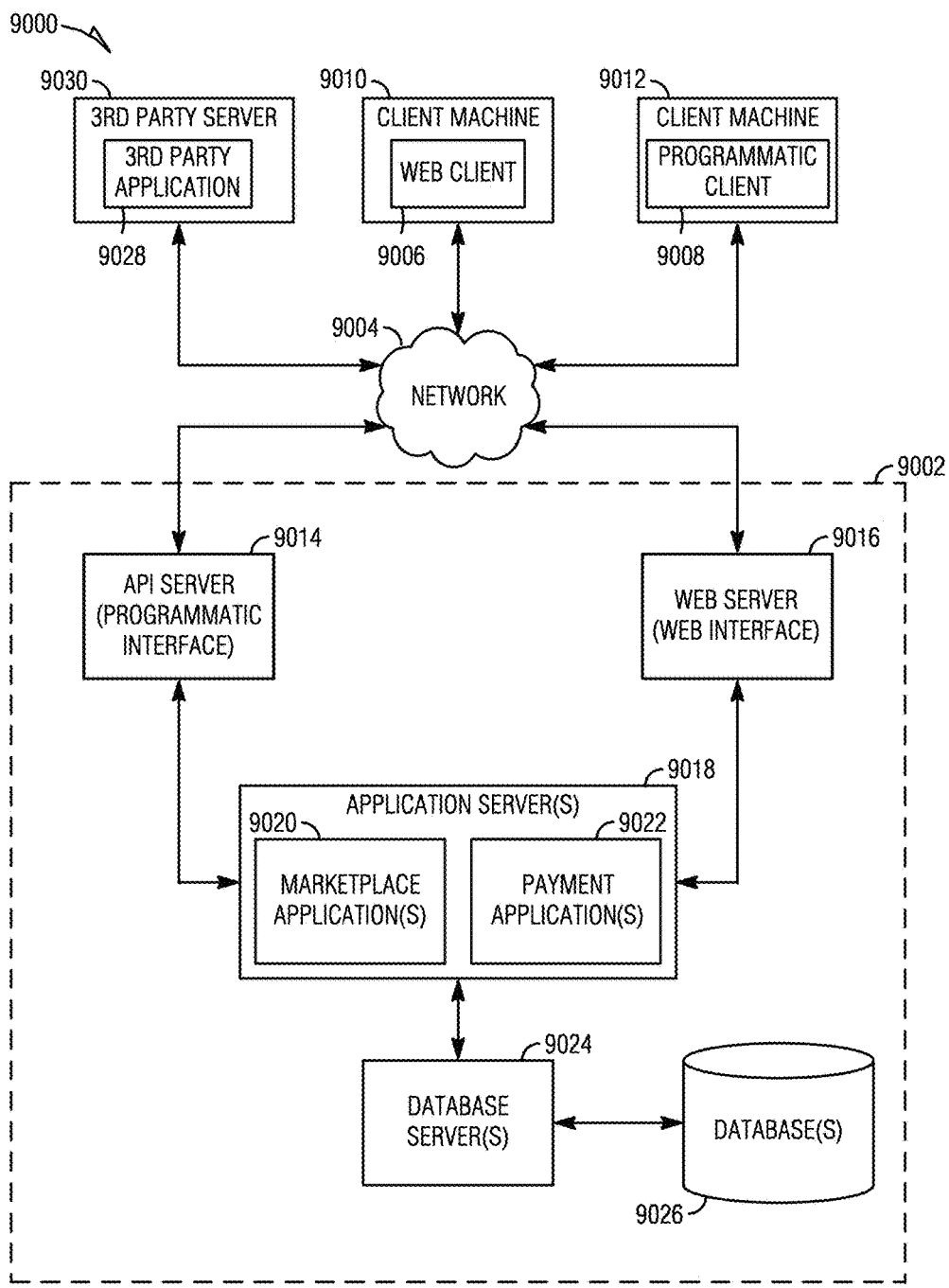
FIG. 9 shows one example of an online commerce system that can be used in conjunction with the current disclosure.

In some examples, the various methods described herein may be implemented as part of a network commerce system. FIG. 9 is a schematic diagram illustrating a network system having a client-server architecture, according to an example embodiment. A networked system 9002, in the example forms of a network-based marketplace or publication system, provides server-side functionality, via a network 9004 (e.g., the Internet or Wide Area Network (WAN)) to one or more clients. FIG. 9 illustrates, for example, a web client 9006 (e.g., a browser, such as the Internet Explorer browser developed by Microsoft Corporation of Redmond, Wash. State), and a programmatic client 9008 executing on respective client machines 9010 and 9012.

An Application Program Interface (API) server 9014 and a web server 9016 are coupled to and provide programmatic and web interfaces, respectively, to one or more application servers 9018. The application servers 9018 host one or more marketplace applications 9020 and payment applications 9022. The application servers 9018 are, in turn, shown to be coupled to one or more database servers 9024 that facilitate access to one or more databases 9026.

The marketplace applications 9020 may provide a number of marketplace functions and services to users that access the networked system 9002. The payment applications 9022 may likewise provide a number of payment services and functions to users. The payment applications 9022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 9020. While the marketplace and payment applications 9020 and 9022 are shown in FIG. 9 to both form part of the networked system 9002, it will be appreciated that, in alternative embodiments, the payment applications 9022 may form part of a payment service that is separate and distinct from the networked system 9002.

Further, while the system 9000 shown in FIG. 9 employs a client-server architecture, the present invention is, of course, not limited to such an architecture, and may equally find application in a distributed, or peer-to-peer architecture system, for example. The various marketplace and payment applications 9020 and 9022 may also be implemented as stand-alone software programs, which do not necessarily have networking capabilities.

The web client 9006 accesses the various marketplace and payment applications 9020 and 9022 via the web interface supported by the web server 9016. Similarly, the programmatic client 9008 accesses the various services and functions provided by the marketplace and payment applications 9020 and 9022 via the programmatic interface provided by the API server 9014. The programmatic client 9008 may, for example, be a seller application (e.g., the TurboLister application developed by eBay Inc., of San Jose, Calif.) to enable sellers to author and manage listings on the networked system 9002 in an off-line manner, and to perform batch-mode communications between the programmatic client 9008 and the networked system 9002.

FIG. 9 also illustrates a third party application 9028, executing on a third party server machine 9030, as having programmatic access to the networked system 9002 via the programmatic interface provided by the API server 9014. For example, the third party application 9028 may, utilizing information retrieved from the networked system 9002, support one or more features or functions on a website hosted by the third party. The third party website may, for example, provide one or more promotional, marketplace or payment functions that are supported by the relevant applications of the networked system 9002.

The present subject matter falls into the category of personalization applications 10010 (discussed below in the description of FIG. 10). These applications may be housed on the application server(s) 9018 and may be considered marketplace applications 9020. In various embodiments, the personalization applications 10010 have different degrees of interaction with the database servers 9024. In an embodiment, user, item, and query histories are accessed from database servers 9024. Using such information, the personalization applications 10010 may generate a personalized recommendation of a volatile item.

Marketplace Applications

Figure 10:
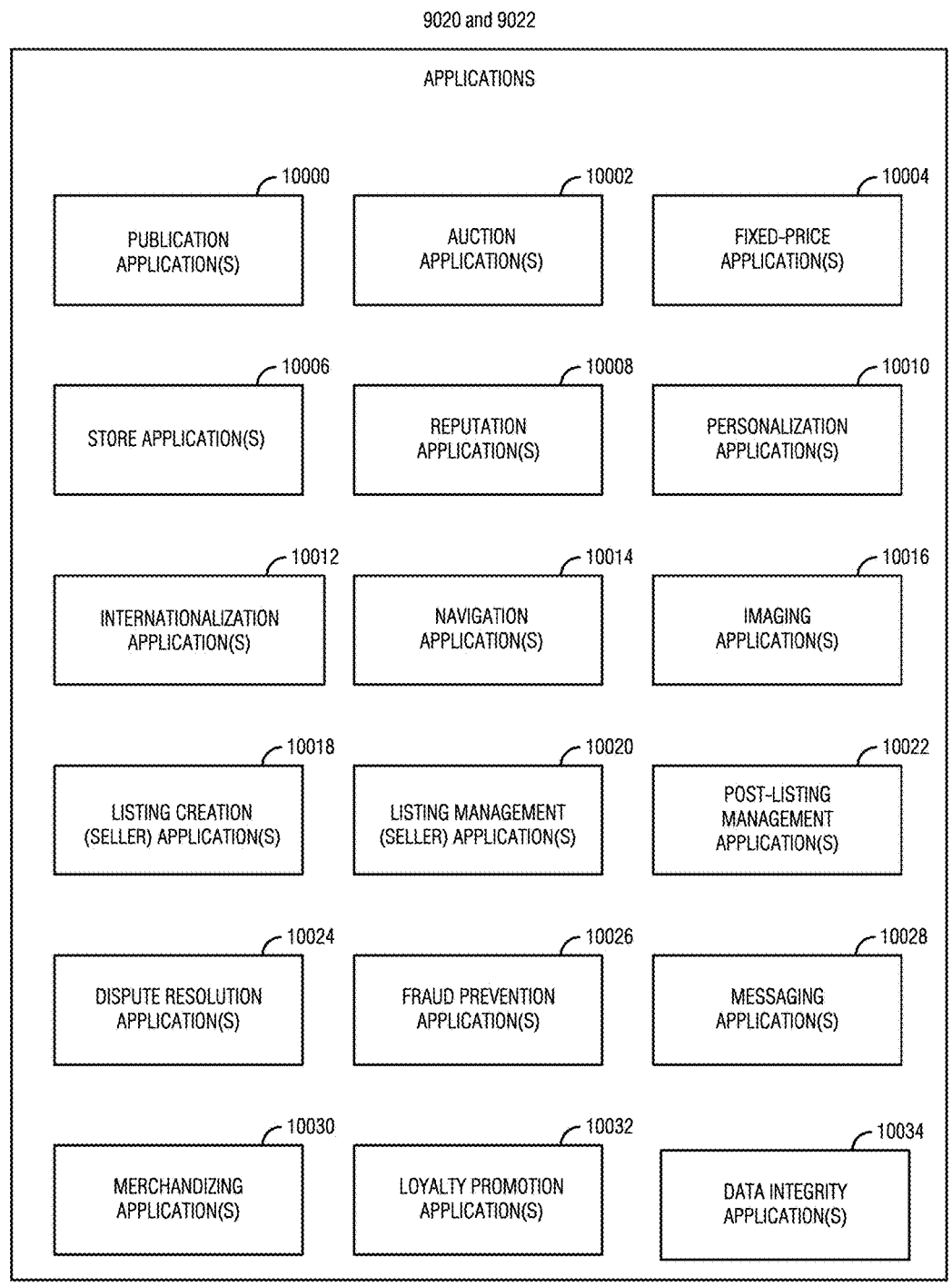
FIG. 10 shows one example of marketplace applications and payment applications that can be used in conjunction with the current disclosure.

FIG. 10 is a block diagram illustrating multiple marketplace applications that, in an example embodiment, are provided as part of a network-based marketplace. FIG. 9 includes multiple applications 9020 and 9022 that, in one example embodiment, are provided as part of the networked system 9002. The applications 9020 may be hosted on dedicated or shared server machines (not shown) that are communicatively coupled to enable communications between server machines. The applications themselves are communicatively coupled (e.g., via appropriate interfaces) to each other and to various data sources so as to allow information to be passed between the applications or so as to allow the applications to share and access common data. The applications may furthermore access server one or more databases 9026 via the database servers 9024.

The networked system 9002 may provide a number of publishing, listing and price-setting mechanisms whereby a seller may list (or publish information concerning) goods or services for sale. A buyer may express interest in or indicate a desire to purchase such goods or services, and a price may be set for a transaction pertaining to the goods or services. To this end, the marketplace applications 9020 are shown to include at least one publication application 10000 and one or more auction applications 10002 which support auction-format listing and price setting mechanisms (e.g., English, Dutch, Vickrey, Chinese, Double, Reverse auctions etc.). The various auction applications 10002 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 10004 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 10006 allow a seller to group listings within a "virtual" store, which may be branded and otherwise personalized by and for the seller. Such a virtual store may also offer promotions, incentives and features that are specific and personalized to a relevant seller.

Reputation applications 10008 allow users that transact, utilizing the networked system 9002, to establish, build and maintain reputations, which may be made available and published to potential trading partners. Consider that where, for example, the networked system 9002 supports person-to-person trading, users may otherwise have no history or other reference information whereby the trustworthiness and credibility of potential trading partners may be assessed. The reputation applications 10008 allow a user, for example through feedback provided by other transaction partners, to establish a reputation within the networked system 9002 over time. Other potential trading partners may then reference such a reputation for the purposes of assessing credibility and trustworthiness.

The networked system 9002 may support a number of marketplaces that are customized, for example, for specific geographic regions. A version of the networked system 9002 may be customized for the United Kingdom, whereas another version of the networked system 9002 may be customized for the United States. Each of these versions may operate as an independent marketplace, or may be customized (or internationalized) presentations of a common underlying marketplace. The networked system 9002 may, accordingly, include a number of internationalization applications 10012 that customize information (and/or the presentation of information) by the networked sys-tem 9002, according to predetermined criteria (e.g., geographic, demographic or marketplace criteria). For example, the internationalization applications 10012 may be used to support the customization of information for a number of regional websites that are operated by the networked system 9002 and that are accessible via respective web servers 9016.

Navigation of the networked system 9002 may be facilitated by one or more navigation applications 10014. For example, a search application (as an example of a navigation application) may enable key word searches of listings published via the networked system 9002. A browse application may allow users to browse various category, catalogue, or inventory data structures according to which listings may be classified within the networked system 9002. Various other navigation applications may be provided to supplement the search and browsing applications.

In order to make listings visually informing and attractive, the marketplace applications 9020 may include one or more imaging applications 10016 with which users may upload images for inclusion within listings. An imaging application 10016 also operates to incorporate images within viewed listings. The imaging applications 10016 may also support one or more promotional features, such as image galleries that are presented to potential buyers. For example, sellers may pay an additional fee to have an image included within a gallery of images for promoted items.

Listing creation applications 10018 allow sellers to conveniently author listings pertaining to goods or services that they wish to transact via the networked system 9002. The listing management applications 10020 then allow sellers to manage such listings. Specifically, where a particular seller has authored and/or published a large number of listings, the management of such listings may present a challenge. The listing management applications 10020 provide a number of features (e.g., auto-re-listing, inventory level monitors, etc.) to assist the seller in managing such listings. One or more post-listing management applications 10022 also assist sellers with a number of activities that typically occur post-listing. For example, upon completion of an auction facilitated by one or more auction applications 10002, a seller may wish to leave feedback regarding a particular buyer. To this end, a post-listing management application 10022 may provide an interface to one or more reputation applications 10008 so as to allow the seller to conveniently provide feedback regarding multiple buyers to the reputation applications 10008.

Dispute resolution applications 10024 provide mechanisms whereby disputes arising between transacting parties may be resolved. For example, the dispute resolution applications 10024 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 10026 implement fraud detection and prevention mechanisms to reduce the occurrence of fraud within the networked system 9002.

Messaging applications 10028 are responsible for the generation and delivery of messages to users of the networked system 9002, Such message, for example, advise users regarding the status of listings at the networked system 9002 (e.g., providing "outbid" notices to bidders during an auction process or to provide promotional and merchandising information to users). Respective messaging applications 9028 may utilize any one of a number of message delivery networks and platforms to deliver messages to users. For example, messaging applications 10028 may deliver electronic mail (e-mail), instant message (FM), Short Message Service (SMS), text, facsimile, or voice (e.g., Voice over IP (VoIP)) messages via the wired (e.g., the Internet), Plain Old Telephone Service (POTS), or wireless mobile, cellular, WiFi, WiMAX) networks.

Merchandising applications 10030 support various merchandising functions that are made available to sellers to enable sellers to increase sales via the networked system 9002. The merchandising applications 10030 also operate the various merchandising features that may be invoked by sellers, and may monitor and track the success of merchandising strategies employed by sellers.

The networked system 9002 itself, or one or more parties that transact via the networked system 9002, may operate loyalty programs that are supported by one or more loyalty/promotions applications 10032. For example, a buyer may earn loyalty or promotions points for each transaction established and/or concluded with a particular seller and may be offered a reward for which accumulated loyalty points may be redeemed.

Data integrity applications 10034 support various functions that serve to prevent users in the networked system 9002 from incorrectly entering information. The data integrity applications 10034 also may interact with the fraud prevention applications 10026 to maintain the integrity of the auctions by preventing fraud perpetrated on the basis of typographical mistake when bidding.

Personalization applications 10010 allow users of the networked system 9002 to personalize various aspects of their interactions with the networked system 9002. For example a user may, utilizing an appropriate personalization application 10010, create a personalized reference page at which information regarding transactions to which the user is (or has been) a party may be viewed. Further, a personalization application 10010 may enable a user to personalize listings and other aspects of their interactions with the networked system 9002 and other parties. Other examples include providing personalized recommendations of various items.

Figure 11:
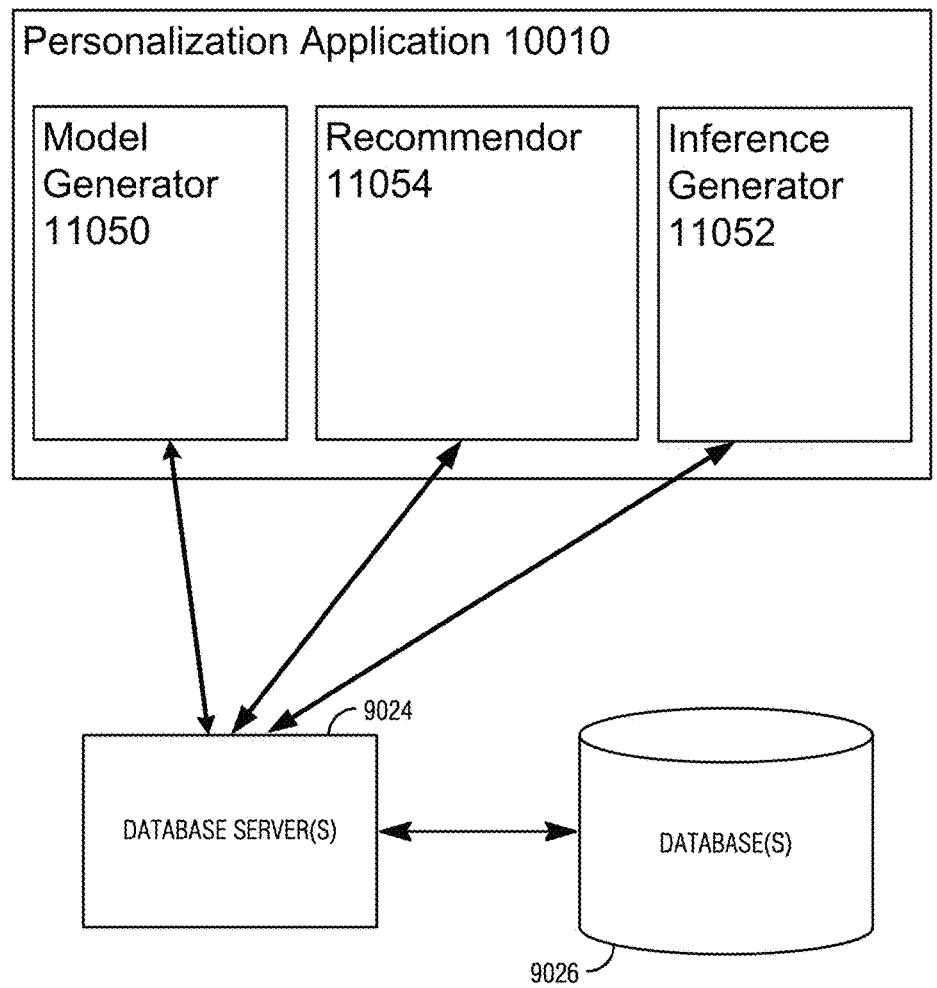
FIG. 11 shows a personalization application according to one example implementation.

FIG. 11 illustrates one example system implementation of the present disclosure. Personalization Application 10010 contains, in one example, model generator 110050, recommendor 110054, inference generator 110052, and possibly other components. Model generator 110050 takes user, query, and item information from database 9026 through database server 9024 and uses this information to implement the user or item based model fitting described above. The inference generator 110052 uses the same information to learn or update either $\Theta_u$ or $\Psi_i$ for a user u or item i. The recommendor 110054 takes the generated models and provides a personalized recommendation for an item based on the method described above. This personalized recommendation can then be displayed by the commerce system. Database server 9024 and database 9026 can be the same or a different database and database server than that described in FIG. 9.

Figure 12:
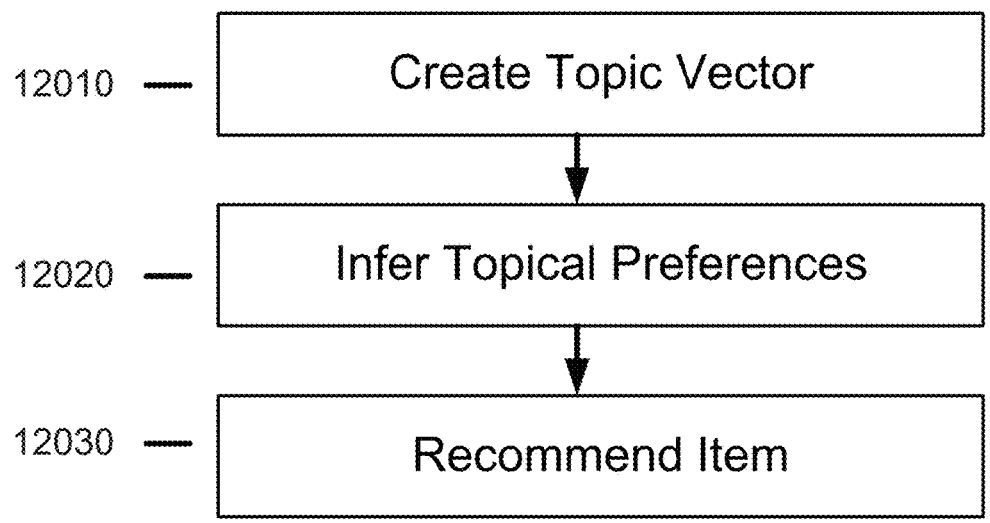
FIG. 12 shows a method for creating a personalized recommendation of an item according to one example.

FIG. 12 illustrates, in one example, the method steps of the present disclosure. In particular, in step 12010, the topic vector is created. The topic vector is a set of all the $\Phi_k$ probability distributions for each k topic. Thus, in one example, if ten topics are modelled, then the topic vector will contain ten $\Phi_k$ probability distributions. As already stated, each probability distribution $\Phi_k$ corresponds to a topic and contains the probability estimations that a given search query or queries corresponds to the topic k. These probability estimates can be generated by either the user-query information, or the item-query information generated by historical data as already described. If the user-query information is used, the system first creates the user preference distribution $\Theta_u$ from the historical user-query data for all the historical users. If the item-query information is used to generate $\Phi_k$ then the probability distribution for each item i, $\Psi_i$, is created. Then, either $\Theta_u$ or $\Psi_i$ is used to generate $\Phi_k$.

In step 12020, the user preference distribution $\Theta_u$ is created for a particular user if $\Theta_u$ was not already created as part of step 12010 (i.e. a new user), or $\Theta_u$ can be updated in step 12020 to reflect new queries entered by the user. As already stated, $\Theta_u$ contains a list of probabilities that a particular user u is interested in the particular modelled topics. In some examples, for each topic k, $\Theta_u$ will contain a probability that the user u is interested in that topic k. In other examples, only a fixed number of topics is stored. In yet other examples, only topics which exceed a certain predetermined probability threshold are stored.

In step 12030, an item is recommended by the system. To do this, the system finds the user preference distribution $\Theta_u$ for the particular user (in this case, user u) and then searches the user preference distribution for a topic or a set of topics that have a high probability of being of interest to the particular user. From there, the particular probability distribution(s) $\Phi_k$ that corresponds to the particular selected topic or topics are retrieved from the topic vector. Each returned $\Phi_k$ in searched for a particular search query that has a high probability of being related to the selected topic is returned. The search query or queries returned are then executed on a search engine of the internet or some other marketplace. In one example, the marketplace is that of an online marketplace such as the one operated by eBay, Inc. of San Jose, Calif. Some or all of the items that are returned by the search are then presented to the users.

Figure 13:
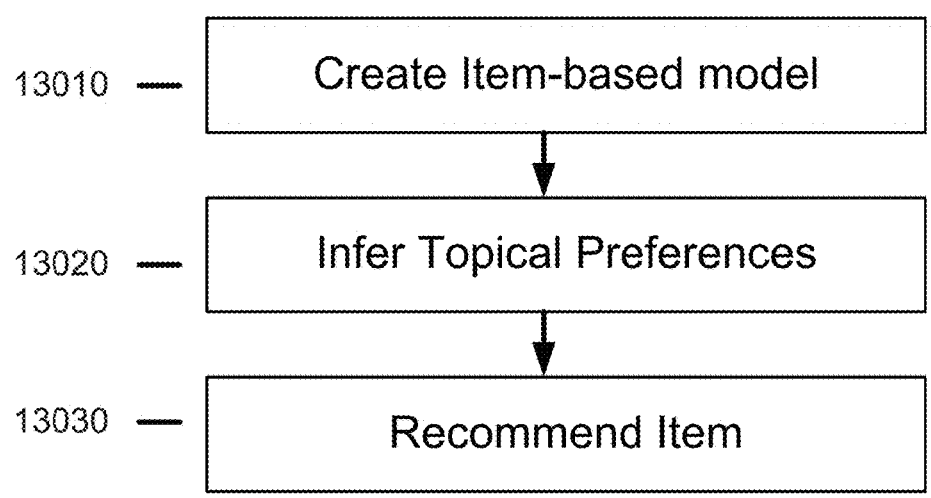
FIG. 13 shows a method for creating a personalized recommendation of an item according to another example.

Another example implementation is shown in FIG. 13. At 13010 the item based model $\Psi_i$ is created based on the item-query mappings. At 13020 the topical preferences of a user is inferred by creating the $\Theta_u$ for a particular user. At step 13030 an item is recommended for the user by selecting atopic from the $\Theta_u$ for a particular user that has a high probability of interest and then using that topic to ascertain a particular item in the set of items $\Psi_i$ that has a high probability of relating to the chosen topic. The item is then presented to a user.

In some examples, it is also possible to add a temporal aspect to the method to reflect the evolution of the latent topics and user preferences. This may include modeling short-term effects, such as topics that become prominent because of external events (e.g., Super Bowl), cyclic topic shifts that arise in certain seasons, as well as long term topic changes that appear, e.g., from new products introduced in the market.

Disclosed is a method for user personalization and recommendation of search queries and volatile items based on search query analysis. The method is based on mapping both users and items to a common latent topic space where collaborative filtering and item recommendation can be made. This decoupling of users and items also allows for efficient inference for new items and users and recommendation of relevant items in a volatile setting such as the eBay online marketplace.

Example Machine Implementation

Figure 14:
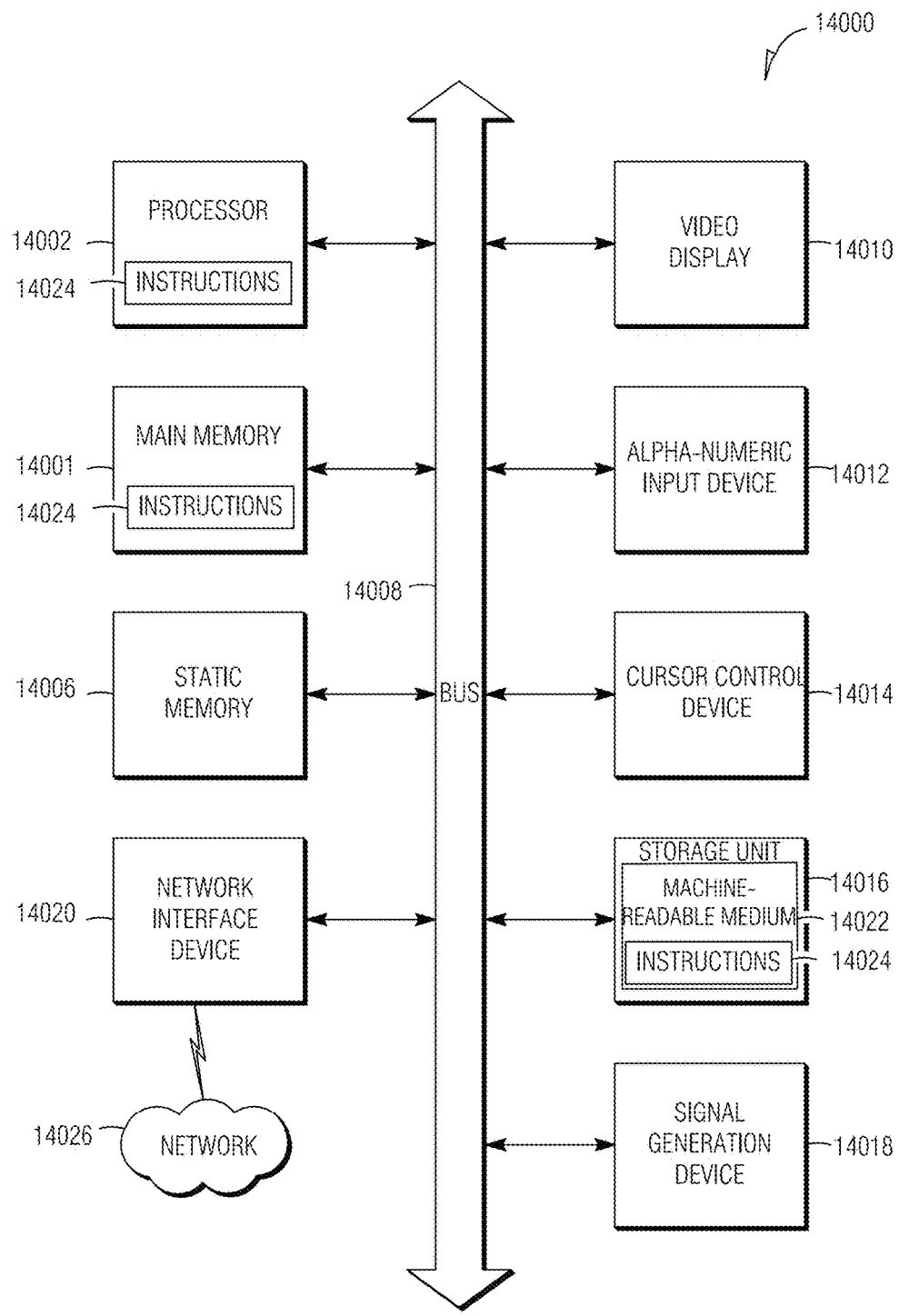
FIG. 14 shows a computing device according to one example.

FIG. 14 illustrates components of a machine 14000, according to some example embodiments, that is able to read instructions from a machine-readable medium (e.g., machine-readable storage medium) and perform any one or more of the methodologies discussed herein. Specifically, FIG. 14 shows a diagrammatic representation of the machine 14000 in the example form of a computer system and within which instructions 14024 (e.g., software) for causing the machine 14000 to perform any one or more of the methodologies discussed herein may be executed. In alternative embodiments, the machine 14000 operates as a standalone device or may be connected (e.g., networked) to other machines. In a networked deployment, the machine 14000 may operate in the capacity of a server machine or a client machine in a server-client network environment, or as a peer machine in a peer-to-peer (or distributed) network environment. The machine 14000 may be a server computer, a client computer, a personal computer (PC), a tablet computer, a laptop computer, a netbook, a set-top box (SIB), a personal digital assistant (PDA), a cellular telephone, a smartphone, a web appliance, a network router, a network switch, a network bridge, or any machine capable of executing the instructions 14024 (sequentially or otherwise) that specify actions to be taken by that machine. Further, while only a single machine is illustrated, the term "machine" shall also be taken to include a collection of machines that individually or jointly execute the instructions 14024 to perform any one or more of the methodologies discussed herein.

The machine 14000 includes a processor 14002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 14001, and a static memory 14006, which are configured to communicate with each other via a bus 14008. The machine 14000 may further include a video display 14010 (e.g., a plasma display panel (PDP), a liquid crystal display (LCD), a projector, or a cathode ray tube (CRT)) The machine 14000 may also include an alphanumeric input device 14012 (e.g., a keyboard), a cursor control device 14014 (e.g., a mouse, a touchpad, a trackball, a joystick, a motion sensor, or other pointing instrument), a storage unit 14016, a signal generation device 14018 (e.g., a speaker), and a network interface device 14020.

The storage unit 14016 includes a machine-readable medium 14022 on which is stored the instructions 14024 (e.g., software) embodying any one or more of the methodologies or functions described herein. The instructions 14024 may also reside, completely or at least partially, within the main memory 14001, within the processor 14002 (e.g., within the processor's cache memory), or both, during execution thereof by machine 14000. Accordingly, the main memory 14001 and the processor 14002 may be considered as machine-readable media. The instructions 14024 may be transmitted or received over a network 14026 via the network interface device 14020.

Method embodiments illustrated herein may be computer-implemented, Some embodiments may include computer-readable media encoded with a computer program software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g.; a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor.

It will be appreciated that the decision to implement a hardware module mechanically; in dedicated and permanently configured circuitry, or in temporarily configured circuitry (e.g., configured by software) may be driven by cost and time considerations.

Accordingly, the term "hardware module" should be understood to encompass a tangible entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by hose of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of creating a personalized recommendation of a product, the method comprising: using one or more processors:
    creating a first plurality of probability distributions based upon a dataset that includes a plurality of products and a list of search queries input into a search engine of an electronic marketplace that led to those products over a predetermined period of time, each of the first plurality of probability distributions corresponding to a respective one of a plurality of latent topics and describing, for each respective search query in the list of search queries, a probability that the respective latent topic is related to the respective search query;
    creating a user-based probability distribution for a user based upon the first plurality of probability distributions and a second list of search queries previously entered by the user, the user-based probability distribution describing a probability that the user is interested in each of the plurality of latent topics;
    selecting a latent topic from the user-based probability distribution that has a probability above a threshold probability;
    selecting a search query from one of the first plurality of probability distributions that has a probability above a threshold probability relating to the selected latent topic;
    submitting the search query to the search engine of the electronic marketplace; and
    recommending to the user, at least one search result received from the search engine of the electronic marketplace in response to the submitted search query, the at least one search result describing a volatile product that is part of a product inventory on a temporary basis.

2. The method of claim 1, wherein the user is one of a plurality of users that submitted search queries in the dataset.

3. The method of claim 1, wherein creating the first plurality of probability distributions comprises using at least one of: a variational expectation-maximization algorithm, an expectation propagation algorithm, or Gibbs sampling.

4. The method of claim 1, wherein recommending at least one search result comprises recommending a top search result.

5. The method of claim 1, further comprising retrieving the list of search queries from a database of an online commerce site.

6. The method of claim 1, wherein the user-based probability distribution is a multinomial probability distribution.

7. The method of claim 1, wherein the search query is a search query that the user has not previously issued.

8. A system for creating a personalized recommendation of a product, the system comprising:
one or more processors;
a memory including instructions, which when executed by the one or more processors, cause the one or more processors to perform operations comprising:
creating a first plurality of probability distributions based upon a dataset that includes a plurality of products and a list of search queries input into a search engine of an electronic marketplace that led to those products over a predetermined period of time, each of the first plurality of probability distributions corresponding to a respective one of a plurality of latent topics and describing, for each respective search query in the list of search queries, a probability that the respective latent topic is related to the respective search query;
creating a user-based probability distribution for a user based upon the first plurality of probability distributions and a second list of search queries previously entered by the user, the user-based probability distribution describing a probability that the user is interested in each of the plurality of latent topics;
selecting a latent topic from the user-based probability distribution that has a probability that is above a threshold probability;
selecting a search query from one of the first plurality of probability distributions that has a probability above a threshold probability relating to the selected latent topic;
submitting the search query to the search engine of the electronic marketplace; and
recommending to the user, at least one search result received from the search engine of the electronic marketplace in response to the submitted search query, the at least one search result describing a volatile product that is part of a product inventory on a temporary basis.

9. The system of claim 8, wherein the user is one of a plurality of users that submitted search queries in the dataset.

10. The system of claim 8, wherein the operations of creating the first plurality of probability distributions comprises the operations of using at least one of: a variational expectation-maximization algorithm, an expectation propagation algorithm, or Gibbs sampling.

11. The system of claim 8, wherein the operations of recommending at least one search result comprises the operations of recommending a top search result.

12. The system of claim 8, wherein the operations further comprise retrieving the list of search queries from a database of an online commerce site.

13. The system of claim 8, wherein the user-based probability distribution is a multinomial probability distribution.

14. The system of claim 8, wherein the high-ranking search query is a search query that the user has not previously issued.

15. A non-transitory machine readable medium, including instructions, which when executed by one or more processors of a machine, cause the machine to perform operations comprising:
creating a first plurality of probability distributions based upon a dataset that includes a plurality of products and a list of search queries input into a search engine of an electronic marketplace that led to those products over a predetermined period of time, each of the first plurality of probability distributions corresponding to a respective one of a plurality of latent topics and describing, for each respective search query in the list of search queries, a probability that the respective latent topic is related to the respective search query;
creating a user-based probability distribution for a user based upon the first plurality of probability distributions and a second list of search queries previously entered by the user, the user-based probability distribution describing a probability that the user is interested in each of the plurality of latent topics;
selecting a latent topic from the user-based probability distribution that has a probability above a threshold probability;
selecting a search query from one of the first plurality of probability distributions that has a probability above a threshold probability relating to the selected latent topic;
submitting the search query to the search engine of the electronic marketplace; and
recommending to the user, at least one search result received from the search engine of the electronic marketplace in response to the submitted search query, the at least one search result describing a volatile product that is part of a product inventory on a temporary basis.

16. The machine-readable medium of claim 15, wherein the user is one of a plurality of users that submitted search queries in the dataset.

17. The machine-readable medium of claim 15, wherein the operations of creating the first plurality of probability distributions comprises the operations of using at least one of: a variational expectation-maximization algorithm, an expectation propagation algorithm, or Gibbs sampling.

18. The machine-readable medium of claim 15, wherein the operations of recommending at least one search result comprises the operations of recommending a top search result.

19. The machine-readable medium of claim 15, wherein the operations further comprise retrieving the list of search queries from a database of an online commerce site.

20. The machine-readable medium of claim 15, wherein the user-based probability distribution is a multinomial probability distribution.

* * * * *

UNITED STATES PATENT AND TRADEMARK OFFICE
CERTIFICATE OF CORRECTION

PATENT NO. : 9,892,171 B2  
APPLICATION NO. : 15/140878  
DATED : February 13, 2018  
INVENTOR(S) : Maksims Ovsjanikovs et al.

Page 1 of 1

It is certified that error appears in the above-identified patent and that said Letters Patent is hereby corrected as shown below:

On the Title Page

In item (57), in Column 2, in "Abstract", Line 6, delete "interring" and insert -- inferring --, therefor.

Signed and Sealed this  
Twenty-sixth Day of June, 2018

Andrei Iancu  
*Director of the United States Patent and Trademark Office*